United States Patent [19]

Clifford

[11] Patent Number: 5,341,438
[45] Date of Patent: Aug. 23, 1994

[54] METHOD AND APPARATUS FOR SEGMENTING AND CLASSIFYING UNCONSTRAINED HANDWRITTEN CHARACTERS

[75] Inventor: Daniel Clifford, Stanford, Calif.

[73] Assignee: Eastman Kodak Company, Rochester, N.Y.

[21] Appl. No.: 918,299

[22] Filed: Jul. 22, 1992

[51] Int. Cl.⁵ .................................. G06K 9/34
[52] U.S. Cl. .......................... 382/9; 382/13
[58] Field of Search ........................ 382/9, 13

[56] References Cited

U.S. PATENT DOCUMENTS

| | | | |
|---|---|---|---|
| 4,046,114 | 9/1991 | Zobel | 382/9 |
| 4,162,482 | 7/1979 | Su | 382/27 |
| 4,173,015 | 10/1979 | Owens et al. | 382/9 |
| 4,325,085 | 4/1982 | Gooch | 358/261 |
| 4,395,697 | 7/1983 | Dargel et al. | 382/41 |
| 4,599,693 | 7/1986 | Denenberg | 364/513 |
| 4,606,069 | 8/1986 | Johnsen | 382/56 |
| 4,630,308 | 12/1986 | Hongo | 382/27 |
| 4,665,441 | 5/1987 | Sakaue et al. | 358/280 |
| 4,680,805 | 7/1987 | Scott | 382/22 |
| 4,700,400 | 10/1987 | Ross | 382/27 |
| 4,785,391 | 11/1988 | Apley et al. | 364/518 |
| 4,821,333 | 4/1989 | Gillies | 382/49 |
| 4,837,842 | 6/1989 | Holt | 382/26 |
| 4,903,311 | 2/1990 | Nakamura | 382/9 |
| 4,903,313 | 2/1990 | Tachikawa | 382/27 |
| 4,918,740 | 4/1990 | Ross | 382/9 |
| 4,932,065 | 6/1990 | Felgajer | 382/9 |
| 4,959,801 | 9/1990 | Apley et al. | 364/518 |
| 4,972,496 | 11/1990 | Sklarew | 382/13 |
| 5,001,765 | 3/1991 | Jeanty | 382/13 |
| 5,018,216 | 5/1991 | Kojima | 382/22 |
| 5,020,121 | 5/1991 | Rosenberg | 382/56 |
| 5,050,228 | 9/1991 | Yoshida et al. | 382/55 |

OTHER PUBLICATIONS

"A review of segmentation and contextual analysis techniques for text recognition", D. G. Elliman and I. T. Lancaster, *Pattern Recognition*, vol. 23, p. 337, 1990.
"Recognition of isolated and simply connected handwritten numerals" M. Shridhar and A. Badreldin, *Pattern Recognition*, vol. 19, pp. 1-12, 1986.
"Character image segmentation" Y. Tsuji and K. Asai, *Proc. Soc. Photo-opt. Instrum. Engrs.*, vol. 504, pp. 2-9, 1984.
"Recursive segmentation and classification of composite character patterns" R. G. Casey and G. Nagy, *Proc. 6th Int. Conf. Pattern Recognition*, vol. 2, pp. 1023-1025, 1982.

*Primary Examiner*—Leo H. Boudreau
*Attorney, Agent, or Firm*—Raymond L. Owens

[57] ABSTRACT

A character recognition system including a method and apparatus for pre-processing handwritten characters prior to segmentation and classification is disclosed. The method includes the steps of forming one or more sub-regions each corresponding to a single character, accumulating the subregions to form an invalid region, and segmenting each character in the invalid region to locate said corresponding characters. The method is included as part of an apparatus for recognizing handwritten text.

11 Claims, 11 Drawing Sheets

METHOD AND APPARATUS FOR SEGMENTING AND CLASSIFYING UNCONSTRAINED HANDWRITTEN CHARACTERS

FIELD OF THE INVENTION

The present invention relates, generally, to methods and apparatus for the machine recognition of characters and text. More particularly, the present invention provides methods and apparatus for segmenting and classifying handwritten characters when additions and/or deletions are interactively made to one or more characters, using a region-accumulating algorithm that maintains and manipulates a plurality of bitmap regions, and a flood-fill segmenting algorithm that segments the characters within each of the plurality of bitmap regions.

BACKGROUND OF THE INVENTION

As machine-based character recognition has become increasingly desirable, a number of systems capable of recognizing handwritten (unconstrained) text have been proposed. These systems typically divide the problem of character recognition into two interrelated tasks: (1) segmenting the text into individual character patterns (performed by the system's "segmentor"); and (2) classifying each character pattern into its alphabetic or numeric value (performed by the system's "classifier"). In any practical character recognition system both of these tasks must be performed efficiently and accurately.

The complexity of these tasks is exacerbated in the context of recognition systems capable of recognizing handwritten text in that each instance of a particular handwritten character inevitably varies slightly, even when written by the same person. This requires that the character recognition system exhibit considerable flexibility in classifying each character. Moreover, it is frequently desirable to recognize handwritten text interactively as it is drawn. This allows the writer to quickly adjust for mistakes in writing and/or misinterpretations by the character recognition system. It is additionally desirable for the electronic pen to respond quickly and smoothly to permit the author to draw smooth continuous lines without hesitation.

Presently known approaches to recognizing handwritten text are encumbered by a trade-off between the complexity of the segmentation task and that of the classification task: since both character segmentation and classification are computationally expensive, the computational requirements and time complexity of each task must be critically evaluated in order to achieve optimal system performance. This is true for several reasons. First, accurate character segmentation reduces the amount and complexity of the character pattern data which must be communicated from the segmentor to the classifier.

Moreover, the accuracy of the character classification task directly depends on the quality of the character pattern data which is transmitted from the segmentor to the classifier. If the character patterns are clear and unambiguous, the classification task is substantially eased. Conversely, the classification task becomes progressively more difficult as the integrity of the character pattern data transmitted from the segmentor to the classifier decreases.

Existing recognition systems typically employ some form of segmentation to initially separate individual character patterns from input image data. Some approaches simply apply a fixed intensity threshold to the sampled image data, effectively converting the input image into a two-dimensional array, called a "bitmap", comprising, for example, black pixels for the character patterns and white pixels for the background. See, for example, U.S. Pat. No. 4,903,303 to Tachikawa and U.S. Pat. No. 4,162,482 to Su.

Similarly, in U.S. Pat. No. 4,606,069 to Johnsen, a technique and apparatus for facsimile encoding employs a pattern extractor to effectively segment graphic elements, such as line segments and black regions, for subsequent matching. The pattern extractor includes a pattern isolator which isolates symbolic and non-symbolic patterns, and a feature extractor which extracts preselected feature patterns for comparison with stored pattern features. Once an individual character (e.g. an alphanumeric "B", "8", or the like) is segmented, the corresponding character pattern data is sent to a classifier for identification of that character.

U.S. Pat. No. 4,700,400 to Ross presents a concise review of character classification methods, wherein the various methods are divided into two categories: "matching" and "feature analysis". In matching methods, each input character is compared on a pixel-by-pixel basis with one or more known character patterns stored in memory. The degree of correlation is ascertained and the stored character having the highest correlation is selected as the match for that input character. In feature analysis, rather than comparing entire character patterns, indicia of specific features (e.g. slope, curvature, line intersections, etc.) are first extracted from the character data and then compared with corresponding indicia of known features of one or more stored characters. Again, the character having the highest degree of correlation is selected as the match for that input character.

Regardless of the particular segmentation scheme employed, presently known character recognition systems typically process the entire bitmap during the segmentation process. Consequently, characters represented in the bitmap which have already been segmented are reprocessed, resulting in unnecessary computational complexity. Moreover, processing the entire bitmap necessarily involves processing irrelevant non-character data such as background and transmission noise.

A need exists for a segmentation method and apparatus which can segment handwritten characters interactively as they are written, thereby allowing the user to continue entering data during the segmentation process.

SUMMARY OF THE INVENTION

The present invention provides an interactive method and apparatus for segmenting handwritten characters which overcomes the foregoing problems associated with existing systems. The method and apparatus of the present invention allows a user to write handwritten characters using a mouse or electronic pen, with the characters being segmented and classified efficiently and accurately as they are written.

In accordance with one aspect of the present invention, the segmentation task is divided into two interrelated tasks: region accumulation and flood-fill segmentation. In a preferred embodiment, a user draws, alters, or erases one or more alphanumeric characters, each comprising one or more pen strokes, on a graphics input device (e.g. an electronic writing tablet) having a corresponding digital bitmap associated therewith. A region accumulation algorithm uses the pixel values and locations corresponding to each pen stroke to determine the smallest portion of the digital bitmap, called an "invalid region", which must be processed in order to properly segment and classify the one or more newly drawn, altered, or erased characters. This represents a significant advantage over known systems which typically process the entire bitmap during the segmentation process.

The overall size of the invalid region depends primarily on: (1) the sizes and orientations of the newly drawn, altered, or erased characters enclosed within the invalid region; and (2) whether the newly drawn, altered, or erased characters overlap one or more previously segmented and classified characters. More particularly, the invalid region comprises the union of the portion of the digital bitmap which encloses the one or more newly drawn, altered, or erased characters which have not yet been segmented or classified, with the portions of the digital bitmap which enclose the one or more previously segmented and classified characters which have been overlapped by the newly drawn, altered or erased characters. The portions of the bitmap which enclose the previously segmented and overlapped characters are called "stale regions".

The invalid region, including each of the one or more stale regions, if any, comprises a list of rectangular zones, with each rectangular zone suitably enclosing a single pen stroke. Each of the rectangular zones is specified by two pairs of coordinates which define the position of their corners within the digital bitmap. Thus, the invalid region may be "accumulated" by concatenating the lists of rectangular zones representing the stale regions into the list of rectangular zones representing the initial invalid region. Those skilled in the art will appreciate that while a preferred embodiment of the invention employs rectangular zones to enclose individual pen strokes, more complex enclosing shapes may be employed. However, the use of more complex enclosing shapes typically increases the amount of processing required to manipulate the zones and perform the accumulating and segmentation processes.

Once the formation of the invalid region is complete, it is operated upon by a segmentation algorithm, such as the flood-fill segmenting algorithm of the present invention. The flood-fill segmentation algorithm can be used either with the above-described region accumulation algorithm or in a stand alone configuration. When used with the region accumulation algorithm, information regarding pen strokes and stale characters is available to aid in segmenting the characters. The flood-fill segmentation algorithm comprises three sub-modules: a preprocessor module, an enclosing rectangle search module, and a bitmap copying module.

The first step of the flood-fill segmentation algorithm involves identifying a single arbitrary pixel, called a "root pixel", on each character within the invalid region. Specifically, a list of candidate root pixels is created for each newly drawn or altered character. Each candidate root pixel is located in one of two ways depending on whether pen strokes have been drawn or erased within the invalid region. If new pen strokes have been drawn, each pixel of each new pen stroke becomes a candidate root pixel; if a pen stroke has been erased or if the flood-fill algorithm is being used without the region accumulation algorithm, all pixels of the invalid region which are "ON", e.g. are logic HI indicating a portion of a pen stroke, are candidate root pixels. Additionally, if one or more previously segmented characters are also contained in the invalid region, the root pixels of each of the previously segmented characters (e.g. stale root pixels) are also added to the list of candidate root pixels.

A second step of the flood-fill segmentation algorithm involves determining the smallest rectangle which encloses a single character in the invalid region. More particularly, an individual rectangle which specifies the size and location of a given character (i.e. encloses that character) is determined using the list of candidate root pixels for that character. Starting with an arbitrary candidate root pixel from the list of candidate root pixels, a recursive search of each neighboring pixel is performed in a rectangular fashion until no additional character pixels (e.g. ON pixels) are found within a pre-determined distance ("tolerance") from any other character pixel. Any candidate root pixels visited during the recursive search are removed from the list of candidate root pixels. As each pixel is visited, the enclosing rectangle is expanded to include the recently visited pixel. Each enclosing rectangle is defined by two pairs of coordinates corresponding to the lower-left and upper-right corners of the enclosing rectangle. The process is repeated for each candidate root pixel in the list of candidate root pixels until there is only one root pixel and one enclosing rectangle per character.

A third step of the flood-fill segmentation algorithm involves copying the portions of the invalid region enclosed by each enclosing rectangle to a separate destination bitmap. Each destination bitmap contains a single segmented character; the destination bitmaps are then sent from the flood-fill segmentation algorithm to a character classifier. The character classifier identifies each segmented character pattern received from the flood-fill segmentation algorithm as a particular alphanumeric character using methods known in the prior art.

BRIEF DESCRIPTION OF THE DRAWINGS

Preferred exemplary embodiments of the present invention will hereinafter be described in conjunction with the appended drawing figures, wherein like numerals denote like elements.

DETAILED DESCRIPTION OF PREFERRED EXEMPLARY EMBODIMENTS

Figure 1:
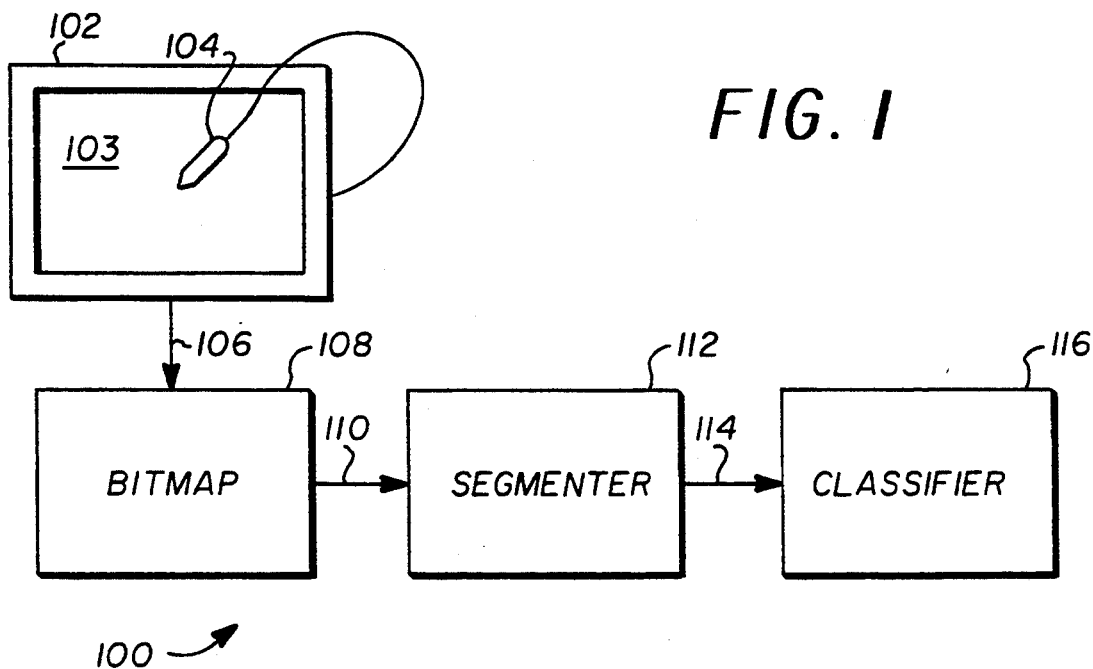
FIG. 1 is a simplified block diagram of an exemplary prior art character recognition system.

Referring now to FIG. 1, a typical prior art character recognition system 100 suitably comprises a graphics input device 102, an electronic pen 104, a bitmap 108, a segmentor 112, and a classifier 116.

In general, a user draws, alters, or erases one or more alphanumeric characters, each comprising one or more pen strokes, onto graphics input device 102 using electronic pen 104. Graphics input device 102 preferably comprises a graphics tablet or a similar electronic drawing device having a smooth two-dimensional drawing surface 103 and an electronic scanning device (not shown) for converting the drawn, altered, or erased characters into corresponding digital electronic signals. The digital electronic signals are transmitted in a conventional manner from graphics input device 102 over a first data bus 106 to digital bitmap 108.

More particularly, each dimension of two-dimensional drawing surface 103 is divided into a plurality of electronic sample points which cooperate to create a two-dimensional sampling grid (not shown). Each point on the two-dimensional sampling grid is defined by a pair of coordinate sample points, one corresponding to each dimension. As the user draws each character, the electronic scanning device repeatedly scans drawing surface 103 by sequentially visiting each point on the sampling grid. The scanning is typically conducted in a raster fashion, for example from left to right and from top to bottom at a rate of, for example, 120 times per second. This scan rate is fast enough so that each pen stroke is captured in its entirety without regard to the speed with which a pen stroke is drawn.

Each time a coordinate point is interrogated during the scanning of drawing surface 103, a determination is made whether electronic pen 104 is in contact with that particular coordinate point; if so, a first digital signal having a first logical value is transmitted from graphics input device 102 to bitmap 108. Similarly, if electronic pen 104 is not in contact with the drawing surface at the particular coordinate point being interrogated, a second digital signal having a second logical value is transmitted from graphics input device 102 to bitmap 108. The process of sequentially interrogating each coordinate point is called "sampling".

The first and second digital signals corresponding to the sampled coordinate points, respectively, are received from graphics input device 102 and stored in bitmap 108. Bitmap 108 suitably comprises a conventional two-dimensional memory array comprising a plurality of storage locations ("pixels"). More particularly, bitmap 108 comprises a unique pixel, having a unique address, for each coordinate point on graphics input device 102; each pixel is configured to store a digital representation of the logical state of its associated coordinate point. Thus, as each character is drawn, altered, or erased by the user, a digital representation ("character pattern") of that character comprising a plurality of first and second digital signal values ("pixel values") is stored in bitmap 108.

From time to time the user indicates that the drawing, alteration, or erasure of a character or group of characters has been completed by either: (1) sending an appropriate message to segmentor 112, for example by depressing a switch on pen 104 or on a mouse (not shown); or (2) holding electronic pen 104 away from graphics input device 102 for a user-specified period of time ("idle time"), for example in the range of 5 to 20 seconds. In either case, when segmentor 112 receives the appropriate message indicating completion of a character, it begins segmenting the background pixel values from the character pixel values. The principal goal of segmentation is to provide well-defined character patterns to classifier 116 for character identification.

More particularly, segmentation is essentially a process of pixel classification; the character patterns stored in bitmap 108 are segmented into subsets by assigning the individual pixels to classes. Stated differently, the pixels are grouped according to one or more common characteristic or feature. For example, in the preceding discussion the pixels comprising a character pattern are assigned a first digital value (e.g. a binary "1" corresponding to a black character pixel), while the background pixels are assigned a second digital value (e.g. a binary "0" corresponding to a white background). Additionally, the pixels comprising a particular character will, in most cases, be located adjacent or in close proximity to one another.

Thus, one method of segmentation might be to group black pixels which are located within a specific distance from one another into a single class, corresponding to a single character pattern. In a preferred embodiment, specific distance, rather than adjacency, is used as a segmentation criterion in order to account for characters which exhibit discrete discontinuities, for example the "dot" of a lowercase "i" or "j". This method, often referred to as "region growing", creates character patterns of a specific size while simultaneously removing isolated pixels resulting from, for example, stray marks or random data transmission noise.

When the user indicates to segmentor 112 that a character or group of characters has been drawn, altered, or erased, all of the pixel values stored in bitmap 108 are then transmitted to segmentor 112 over a second data bus 110. Segmentor 112 then segments the pixel values using one or more processes known in the art, such as the region growing method previously described. Depending on the sophistication of character recognition system 100, the user may continue drawing characters on graphics input device 102 during segmentation.

Presently known character recognition systems typically copy the entire contents of bitmap 108 to a second memory location within segmentor 112, thereby rendering the data stored in bitmap 108 redundant and thus no longer needed. Hence, once the contents of bitmap 108 have been copied to segmentor 112, the user may continue drawing. In other known systems, only a portion of the contents of bitmap 108 is copied to segmentor 112 at a time; thus, the remaining contents of bitmap 108 must remain intact to facilitate subsequent transmission of the remaining data to segmentor 112. Accordingly, the user must wait until the entire bitmap is transmitted to the segmentor before he can resume drawing.

Even if the entire contents of bitmap 108 are copied to a second memory location within segmentor 112, continued drawing during the segmentation process may nonetheless be impermissible. This is due to the large amount of processing capacity generally required to fetch and segment the contents of bitmap 108. Thus, once the segmentation process begins, the user is typically required to suspend drawing until the segmentation process is complete.

Once the segmentation of the pixel values for a character or group of characters is complete, the segmented character patterns are transmitted from segmentor 112 to character classifier 116 over a third data bus 114. Character classifier 116 identifies each segmented character pattern received from segmentor 112 as a particular alphanumeric character using one or more methods known in the art.

For example, in a prior art method of character classification known as "template matching", each segmented character pattern received from segmentor 112 is compared with one or more character patterns (character templates) stored in memory, with each character template corresponding to a known alphanumeric character. Each such comparison is numerically scored, with the numerical score indicating the number of pixels of the character pattern having a corresponding pixel in a character template and, hence, the quality of the match. After a given segmented pattern has been compared with each stored character template, the alphanumeric identity of the character template having the highest numerical score is assigned to the segmented character pattern.

In the context of template matching, the output of classifier 116 typically comprises a list of identified characters and their scores, along with the coordinates specifying the location of each identified character within bitmap 108. This output can be used by character recognition system 100, or by another computer-based system, as input for further processing. For example, in a retail point-of-sale system, the identified characters can be used to identify a product, along with its stock number and price.

Figure 2:
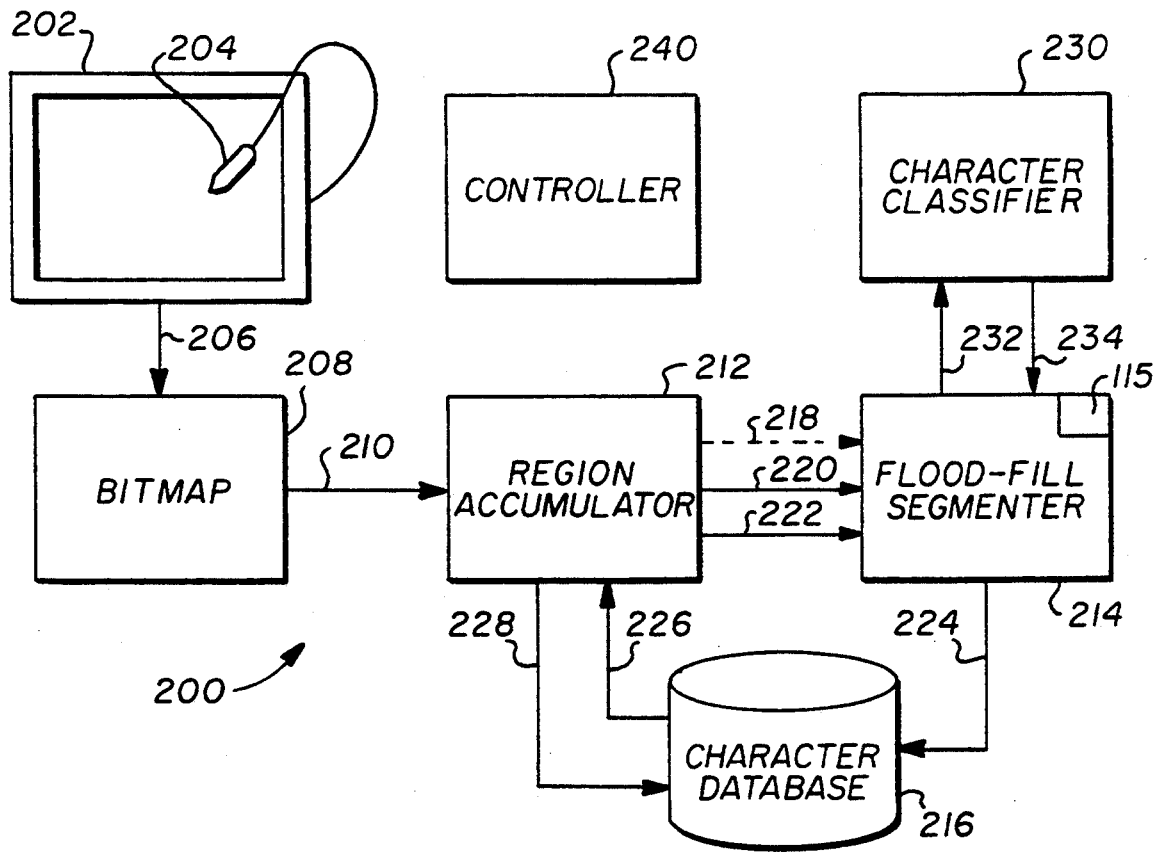
FIG. 2 is a simplified block diagram of a preferred embodiment of a character recognition system in accordance with the present invention.
Figure 3:
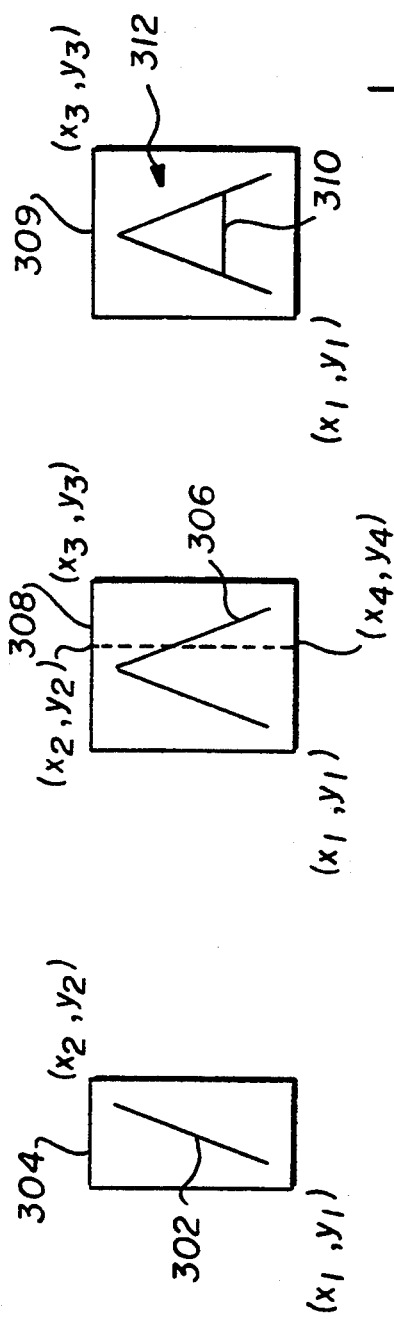
FIGS. 3 and 4 comprise a schematic representation of the formation of an exemplary invalid region by the character recognition system of the present invention.
Figure 4:
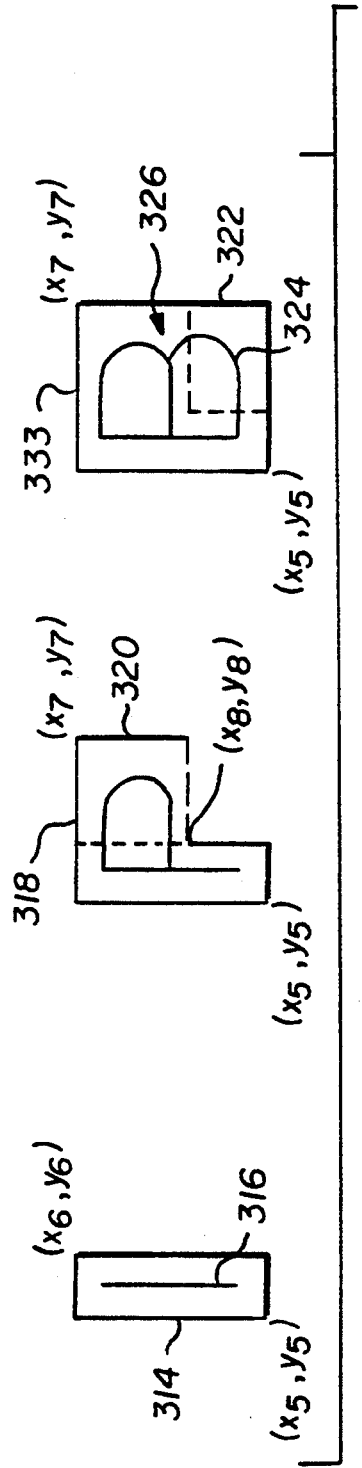

Referring now to FIG. 2, a simplified block diagram of an improved character recognition system 200 in accordance with the present invention preferably comprises a graphics input device 202, an electronic pen 204, a bitmap 208, a region accumulation module 212, a flood-fill segmentation module 214 including a destination bitmap region 215, a character database 216, a character classifier 230, and a controller 240, for example a conventional microprocessor, configured to control the various components comprising system 200 as described herein.

As discussed in connection with FIG. 1, a user draws one or more characters, each comprising one or more pen strokes, on graphics input device 202 using electronic pen 204. As each character is completed, an electronic scanning device (not shown) repeatedly samples the drawing surface of graphics input device 202 by sequentially visiting each point on a sampling grid and converts each drawn character into corresponding digital electronic signals. The sampled digital electronic signals are then transmitted in a conventional manner from graphics input device 202 over a first data bus 206 to bitmap 208.

Bitmap 208 is a two-dimensional memory array comprising a plurality of pixels. Each pixel has a unique address and provides storage for the binary signal value ("pixel value") of a corresponding coordinate point on the two-dimensional sampling grid of graphics input device 202. Thus, as with prior art character recognition system 100, as each input character is drawn, altered, or erased by the user, a character pattern representation of that input character (comprising a plurality of black character and white background pixel values) is stored in bitmap 208.

In contrast to character recognition system 100, however, the character pattern data from bitmap 208 corresponding to each input character is sent to region accumulation module 212 each time the user indicates that a new character has been drawn, altered, or erased. Once a particular character is segmented and classified, its character pattern data is not thereafter reprocessed unless the character is subsequently altered. This feature represents a significant advantage over prior art systems, wherein the entire bitmap is typically processed each time a newly drawn character is segmented and classified. By processing only the amount of data necessary to segment and classify a particular character (or group of characters) at one time, as opposed to also reprocessing previously classified and unaltered characters, the aggregate number of computations required to properly classify text may be dramatically reduced.

More particularly, the character pattern data created when electronic pen 204 is in contact with the drawing surface of graphics input device 202, along with the locations of these pixels within bitmap 208, are sent to region accumulation module 212 over a second data bus 210. Region accumulation module 212 uses the pixel values of the character pattern data to determine the smallest portion of bitmap 208, called an "invalid region", necessary to properly segment and classify one or more newly drawn, altered, or erased characters. The operation of region accumulation module 212 will be discussed later in detail with reference to FIGS. 3-12.

The overall size of the invalid region depends primarily on: (1) the sizes and orientations of the newly drawn, altered, or erased characters; and (2) whether the newly drawn, altered, or erased characters overlap one or more previously segmented and classified characters. More particularly, an invalid region comprises the union of the portion of bitmap 208 which encloses the one or more newly drawn, altered or erased characters which have not yet been segmented or classified, with the portions of bitmap 208 which enclose the one or more previously segmented and classified characters which have been overlapped ("invaded") by the newly drawn, altered, or erased characters. The portions of bitmap 208 which enclose the previously segmented characters which have been invaded by the newly drawn, altered, or erased characters are called "stale regions".

In accordance with a preferred embodiment of the present invention, the invalid region and each of the one or more stale regions is preferably maintained in the form of a list of rectangular zones where each rectangular zone encloses a single pen stroke. Each of the rectangular zones is specified by two or more pairs of coordinates which define the position of their corners within bitmap 208. Thus, the invalid region and each of the one or more stale regions can be "accumulated" by concatenating the list of rectangular zones representing the stale regions, to the list of rectangular zones representing the invalid region. Additionally, while the preferred embodiment uses rectangular-shaped zones to enclose individual pen strokes in order to simplify processing, more complex enclosing shapes may be employed. However, the use of more complex shapes typically increases the amount of processing required to manipulate the shape and perform the segmentation process.

With continued reference to FIG. 2, the user indicates that a character or group of characters has been completed by either: (1) actively sending an appropriate message to region accumulation module 212 in any suitable manner; or (2) holding electronic pen 204 away from graphics input device 202 for the user-specified idle time. In either case, region accumulation module 212 then checks character database 216 to determine if the region corresponding to the new character or characters overlaps any previously segmented and classified characters. Specifically, this involves systematically checking all previously segmented and classified characters stored in character database 216. Region accumulation module 212 identifies any overlapped characters and accumulates the corresponding stale regions into the invalid region. In the context of the present invention, a previously classified character is "overlapped" if a subsequent pen stroke or, alternatively, the rectangle enclosing the pen stroke, enters the enclosing rectangle used to segment the previously classified character, regardless of whether the pen stroke actually intersects the character itself.

When all of the characters stored in character database 216 have been checked, the resulting stale characters are deleted from character database 216. The foregoing accumulation process is repeated until all stale characters are accumulated into the invalid region. The processes of accumulating stale regions into the invalid region and deleting the stale characters from character database 216 are discussed in greater detail with reference to FIGS. 3–12.

Once the formation of the invalid region is complete, a "source bitmap" representing the digital data comprising the invalid region is sent to flood-fill segmenting module 214 over a third data bus 222. Flood-fill segmenting module 214 comprises three sub-modules: a preprocessor module 702, an enclosing rectangle search module 704, and a bitmap copying module 706 (see FIG. 12). The respective functions of each sub-module are described in greater detail in conjunction with the flood-fill segmentation method of the present invention (FIGS. 12–19).

Flood-fill segmenting module 214 individually segments each character contained in the invalid region sent from region accumulation module 212 using a three-step method. The first step in the flood-fill segmentation method involves identifying a single arbitrary pixel (a "root pixel") from a list of candidate root pixels for each character within the invalid region. Specifically, the list of candidate pixels is formed by locating one candidate root pixel on each pen stroke comprising the character. As will be subsequently discussed in greater detail, each candidate root pixel is located in one of two ways depending on whether pen strokes have been added to (e.g. drawn), or deleted from (e.g. erased), the invalid region.

The second step in the flood-fill segmentation method involves determining the smallest rectangle ("enclosing rectangle") which encloses a single character in the invalid region. More particularly, an individual enclosing rectangle which specifies the size and location of a given character is determined using the list of candidate root pixels for that character. Starting with a first candidate root pixel from the list of candidate root pixels, a recursive search is performed on each neighboring pixel until no additional character pixels (e.g. ON pixels) are found within a pre-determined distance ("tolerance") from any other character pixel. Any other candidate root pixels encountered during the recursive search are deleted from the list of candidate root pixels. As each pixel is visited, the enclosing rectangle is expanded to include that pixel if the logic value associated with that pixel is HI (or ON). Each enclosing rectangle is defined by two pairs of coordinates corresponding to the lower-left and upper-right corners of the enclosing rectangle. This second step is repeated for each candidate root pixel remaining in the list of candidate root pixels until there is only one root pixel and one enclosing rectangle per character.

The third step of the flood-fill segmentation involves copying the portion of the invalid region enclosed by each enclosing rectangle to a separate destination bitmap within destination bitmap region 215. Each destination bitmap contains a single segmented character; the destination bitmaps are sent from flood-fill segmentation module 214 to character classifier module 230 over a fourth data bus 232. Character classifier module 230 identifies each segmented character pattern received from segmentor 214 as a particular alphanumeric character using one or more methods known in the art.

Additionally, the root pixels and corresponding destination bitmaps for each segmented character are sent from flood-fill segmentation module 214 to character database 216 over a fifth data bus 224 for storage and use in segmenting additional characters. Character database 216 stores information regarding each character that has been previously segmented and classified, including the character's alphanumeric identity, size (i.e. the size of its enclosing rectangle), and root pixel. The stored character information is subsequently used by region accumulation module 212 to construct additional invalid regions in response to new character input. Additionally, region accumulation module 212 deletes stale character information from character database 216 for characters that are to be re-segmented and re-classified.

The operation of region accumulation module 212 is discussed in detail below in conjunction with FIGS. 3–12. With momentary reference to FIGS. 3 and 4, the general scheme of invalid region formation is illustrated for exemplary characters "A" and "B". Character A comprises pen strokes 302, 306, and 310 and is contained within an invalid region 309. Similarly, character B comprises pen strokes 316, 320, and 324 and is contained within an invalid region 333.

Character A is initiated by drawing pen stroke 302 on graphics input device 202. As pen stroke 302 is drawn, the corresponding pixel values are stored in bitmap 208 and are periodically sent to region accumulation module 212. Region accumulation module 212 uses the corresponding pixel values to create enclosing rectangular zone 304 which encloses pen stroke 302. More particularly, rectangular zone 304 is specified by coordinates $(x_1, y_1)$ and $(x_2, y_2)$ which are the locations of the lower-left and upper-right corners, respectively, of rectangular zone 304. Coordinates $(x_1, y_1)$ and $(x_2, y_2)$ are stored in a coordinate list which defines invalid region 309. Similarly, as pen stroke 306 is added, the coordinates $(x_3, y_3)$ and $(x_4, y_4)$ of corresponding enclosing rectangular zone 308 are concatenated into the list of coordinates representing invalid region 309 to update invalid region 309. Finally, pen stroke 310 is added, completing character A. Because pen stroke 310 is wholly contained within existing invalid region 309, the dimensions of invalid region 309 do not undergo further change as pen stroke 310 is drawn. Thus, invalid region 309 is a list comprising rectangular zones 304 and 308. Those skilled in the art will appreciate that although vertically and horizontally oriented rectangles are employed as the enclosing rectangles in the preferred embodiment, other geometric configurations may suitable be employed.

Character B is similarly initiated by drawing pen stroke 316 on graphics input device 202. As pen stroke 316 is drawn, the corresponding pixel values are stored in bitmap 208 and are periodically sent to region accumulation module 212. Region accumulation module 212 uses the corresponding pixel values to create an enclosing rectangular zone 314 which encloses pen stroke 316. More particularly, rectangular zone 314 is specified by coordinates $(x_5, y_5)$ and $(x_6, y_6)$ corresponding to the locations of the lower-left and upper-right corners, respectively, of rectangular zone 314. Coordinates $(x_5, y_5)$ and $(x_6, y_6)$ are stored in a coordinate list which defines invalid region 309. Similarly, as pen stroke 320 is added, corresponding enclosing rectangular zone 318 is concatenated into rectangular zone 314, and the coordinates of zone 318 are added to the list comprising invalid region 309. Finally, pen stroke 324 is added which forms a third rectangular zone 322 which is concatenated to rectangular zones 314 and 318 to form invalid region 333 which encloses character B. Invalid region 333 thus comprises a list including the coordinates of rectangular zones 314, 318, and 322.

Figure 5:
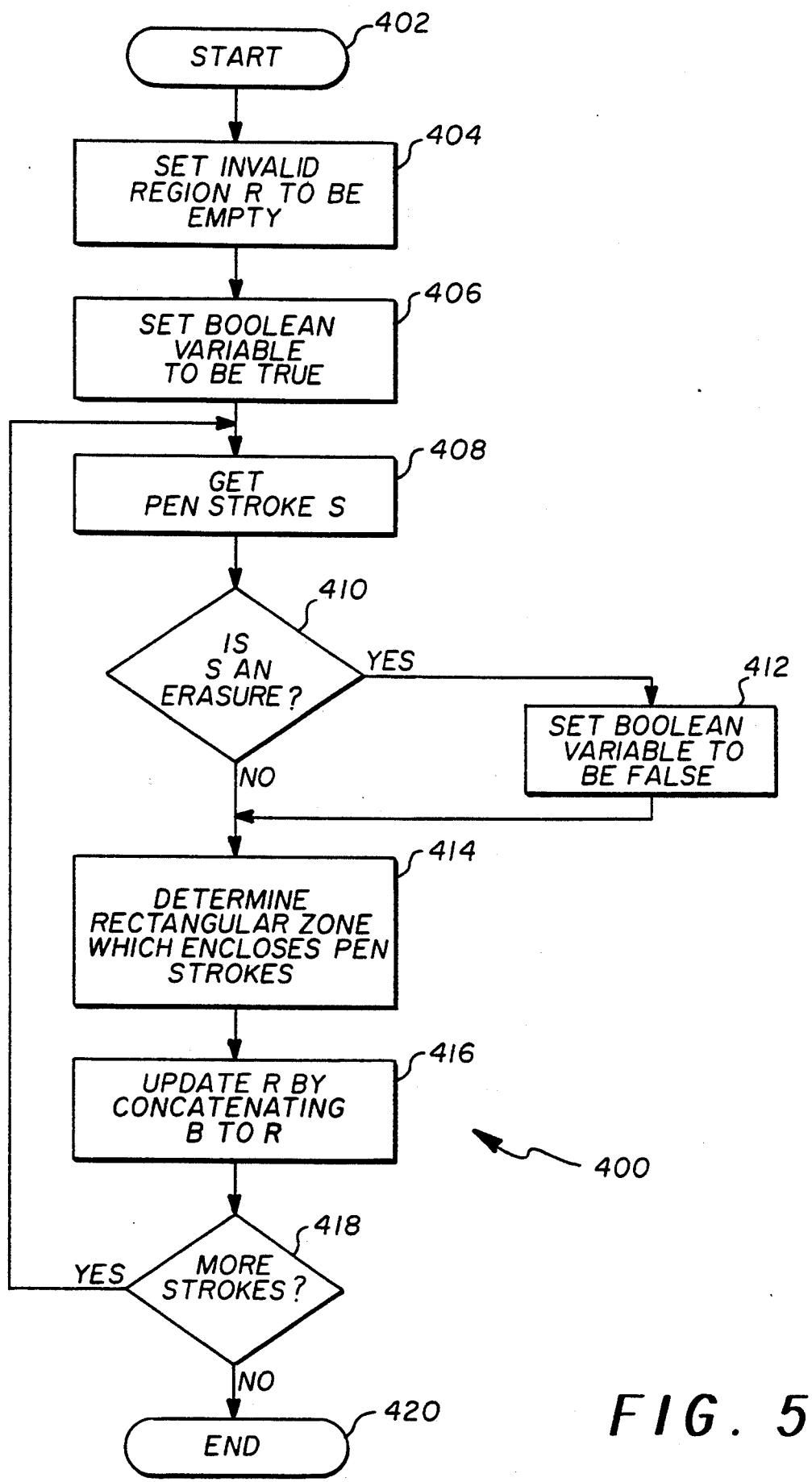
FIG. 5 is a flow chart setting forth the steps used to form the invalid region of FIG. 3.

Referring now to FIG. 5, the manner in which region accumulation module 212 forms the foregoing invalid region will now be described. Prior to the receipt of any pen stroke data, region accumulation module 212 resets an invalid region array R to null (step 404) to indicate that no invalid region currently needs to be segmented. Region accumulation module 212 also sets a Boolean variable to TRUE (step 406) to initially indicate that the received pen strokes do not include any erasures. The function of the Boolean variable is discussed more fully below. Region accumulation module 212 then waits for an exemplary pen stroke S to be drawn on graphics input device 202 (step 408).

As pen stroke S is drawn on graphics input device 202, region accumulation module 212 obtains the pixel values corresponding to pen stroke S (step 408). When pen stroke S has been drawn, region accumulation module 212 determines whether pen stroke S is an erasure (step 410). If pen stroke S is an erasure, region accumulation module 212 sets the Boolean variable to FALSE (step 412). Region accumulation module 212 then determines the appropriate geometric zone, for example the smallest rectangular zone B which encloses pen stroke S (step 414).

Note that while flow chart 400 of FIG. 5 depicts an embodiment of the present invention wherein the entire pen stroke S is obtained (step 408) prior to the determination of the corresponding rectangular zone B (step 414), an alternative embodiment permits rectangular zone B to be determined dynamically while pen stroke S is being drawn.

In either case, after rectangular zone B is determined, invalid region R is updated by concatenating rectangular zone B to invalid region R (step 416). Region accumulation module 212 then waits for additional pen strokes to be drawn (step 418). Specifically, region accumulation module 212 monitors electronic pen 204 to determine if the user has: (1) began drawing another pen stroke; (2) actively sent an appropriate message to region accumulation module 212 to indicate completion of the character; or (3) held electronic pen 204 away from graphics input device 202 for the user-specified idle time, indicating completion of the pen stroke.

When the user begins drawing another pen stroke, region accumulation module 212 again obtains the pixel values corresponding to pen stroke S (step 408). Note that once the Boolean variable is set to FALSE in step 412, it retains this value even if subsequent pen strokes for a particular character are not erasures. When pen stroke S is completed, module 212 again determines the rectangular zone B which encloses pen stroke S (step 414), and concatenates rectangular zone B to invalid region R (step 416). This process continues until the user indicates completion of the character.

When the user indicates completion of the character, module 212 checks character database 216 for overlapped (i.e. stale) characters. More particularly and with reference to FIG. 6, a character count x, which maintains a running count of the number of characters stored in character database 216 which have been checked, is set to one. Additionally, a flag MORE (discussed below) is set to FALSE. Further, a pointer C, which is used to access each character record retrieved from character database 216, is set to null (step 504).

Each character record to be checked is retrieved from character database 208 by setting pointer C to point to the appropriate character record (step 506). The coordinates of invalid region R are then compared with those represented by pointer C to determine whether invalid region R intersects the region enclosing the character represented by pointer C (step 508). More particularly, each of the rectangular zones comprising an invalid region is individually compared with each of the rectangular zones comprising the current character record. The comparison of each pair of rectangular zones (e.g. one from the invalid region and one from the current character record) is accomplished by comparing the respective corners of each rectangular zone to determine whether there is any area which is common between the two rectangular zones. In general, if an invalid region is comprised of N rectangular zones and a character record is comprised of M rectangular zones, then M×N combinations must be checked.

If invalid region R intersects the region represented by pointer C, then invalid region R is updated by concatenating the list of rectangular zones enclosing the pen strokes of the character represented by pointer C into invalid region R (step 510), to form an updated invalid region R. After invalid region R is updated, the retrieved first character record is marked as "stale" (step 512) to indicate that the retrieved character must be re-segmented and re-classified. Flag MORE is then set to TRUE (step 514) to indicate that any characters evaluated previous to the character represented by pointer C must also be checked, and character count x is incremented by one (step 516).

If invalid region R does not intersect the character record corresponding to pointer C (step 508), character count x is incremented by one, and pointer C is reset to null in order to access the next character record (step 516). Character count x is then compared with the number of characters known to be stored in database 216 (step 518) to determine whether there are any more characters to be checked.

If there are more characters to be checked, the next character is retrieved from character database 216 by setting pointer C to point to the character record to be retrieved (step 506). The coordinates of invalid region R are again compared with those represented by pointer C to determine whether invalid region R intersects the current character record indicated by pointer C (step 508). If invalid region R intersects the region represented by pointer C, invalid region R is further updated by concatenating the list of rectangular zones enclosing the pen strokes of the character represented by pointer C to invalid region R (step 510), further updating invalid region R. After invalid region R is updated, the current character record is marked as stale (step 512), the flag MORE is set to TRUE (step 514), and the foregoing process is repeated until there are no more characters to be checked (step 518).

If there are no more characters in character database 216 to be checked (step 518), a determination is made whether the flag MORE has been set to TRUE, to indicate that the characters checked previous to the most recently checked character must be re-checked (step 520). If flag MORE has been set to TRUE, then steps 504-518 are repeated as appropriate until flag MORE is reset to FALSE to indicate that no more characters in database 216 need to be checked. When flag MORE has been reset to FALSE, all of the characters in character database 216 which have been marked as stale are deleted (step 522).

Figure 7:
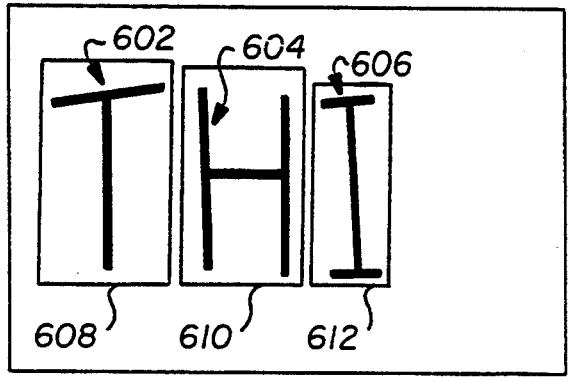
FIGS. 7, 8, 9, 10 and 11 are schematic representations of various states of characters and their corresponding invalid regions in the context of the region-accumulation algorithm of the present invention.

Referring now to FIGS. 5 and 7, a particular example of the segmenting of a character which overlaps a previously segmented character will now be discussed. FIG. 7 shows the first three characters 602, 604, and 606 of the word "THIS" before the final "S" is added. Since each of characters 602-606 has been previously segmented and classified, invalid region R is currently empty. In addition, each of the segmented and classified characters 602-606 is associated with a corresponding region 608-612 as shown. A list of characters 602-606 and their associated regions 608-612 is advantageously maintained by the method and apparatus of the present invention.

Figure 8:
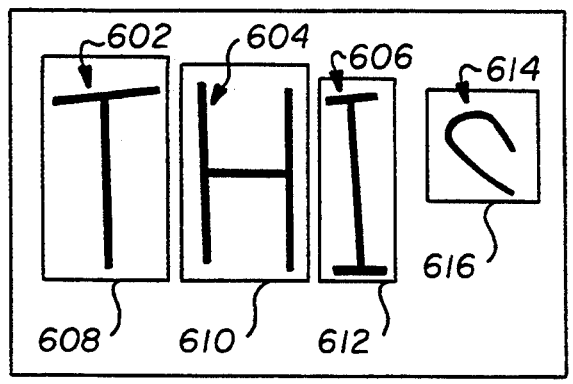

With particular reference to FIGS. 5 and 8, the current invalid region R is set to zero (step 404) and the Boolean variable is set to TRUE (step 406). As the user begins to draw a pen stroke 614 of an exemplary letter S, region accumulation module 212 builds a corresponding rectangular zone which encloses pen stroke 614. More particularly, as pen stroke 614 is drawn, region accumulation module 212 obtains the pixel values corresponding to pen stroke 614 (step 408) from graphics input device 202. Region accumulation module 212 continues expanding the rectangular zone encompassing pen stroke 614 until signaled by the user that pen stroke 614 is complete. Upon completion of pen stroke 614, region accumulation module 212 determines whether pen stroke 614 is an erasure (step 410). Since pen stroke 614 is not an erasure, the Boolean variable remains set to TRUE and region accumulation module continues by determining a resultant invalid region 616 which encloses the entire pen stroke 614 (step 414). The resulting pen stroke 614 and enclosing invalid region 616 is shown in FIG. 9.

Figure 9:
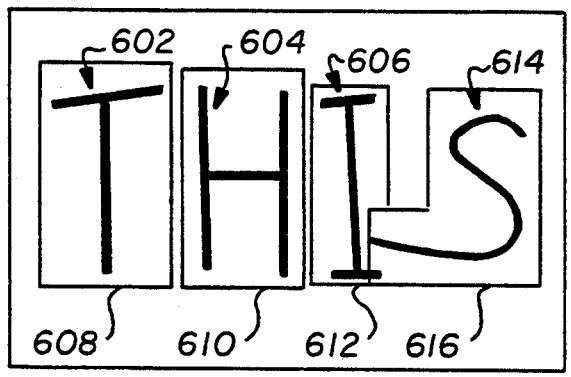

As further shown in FIG. 9, pen stroke 614 and corresponding invalid region 616 overlaps region 612 corresponding to character 606. To ascertain this overlapping in the context of the illustrated embodiments of the invention, the record corresponding to character 606 is retrieved from character database 216 as discussed above in connection with FIG. 6. The coordinates of invalid region 616 are then compared with those of the character record corresponding to character 606. More particularly, each of the rectangular zones comprising invalid region 616 is individually compared with each of the rectangular zones comprising region 612. The comparison of each pair of rectangular zones (e.g. one from invalid region 616 and one from region 612) is accomplished by comparing the respective corners of each rectangular zone to determine whether there is any area which is common between the two rectangular zones. For example, invalid region 616 is comprised of two rectangular zones and stale region 612 is comprised of one rectangular zone; thus, $2 \times 1 = 2$ combinations must be checked.

Figure 6:
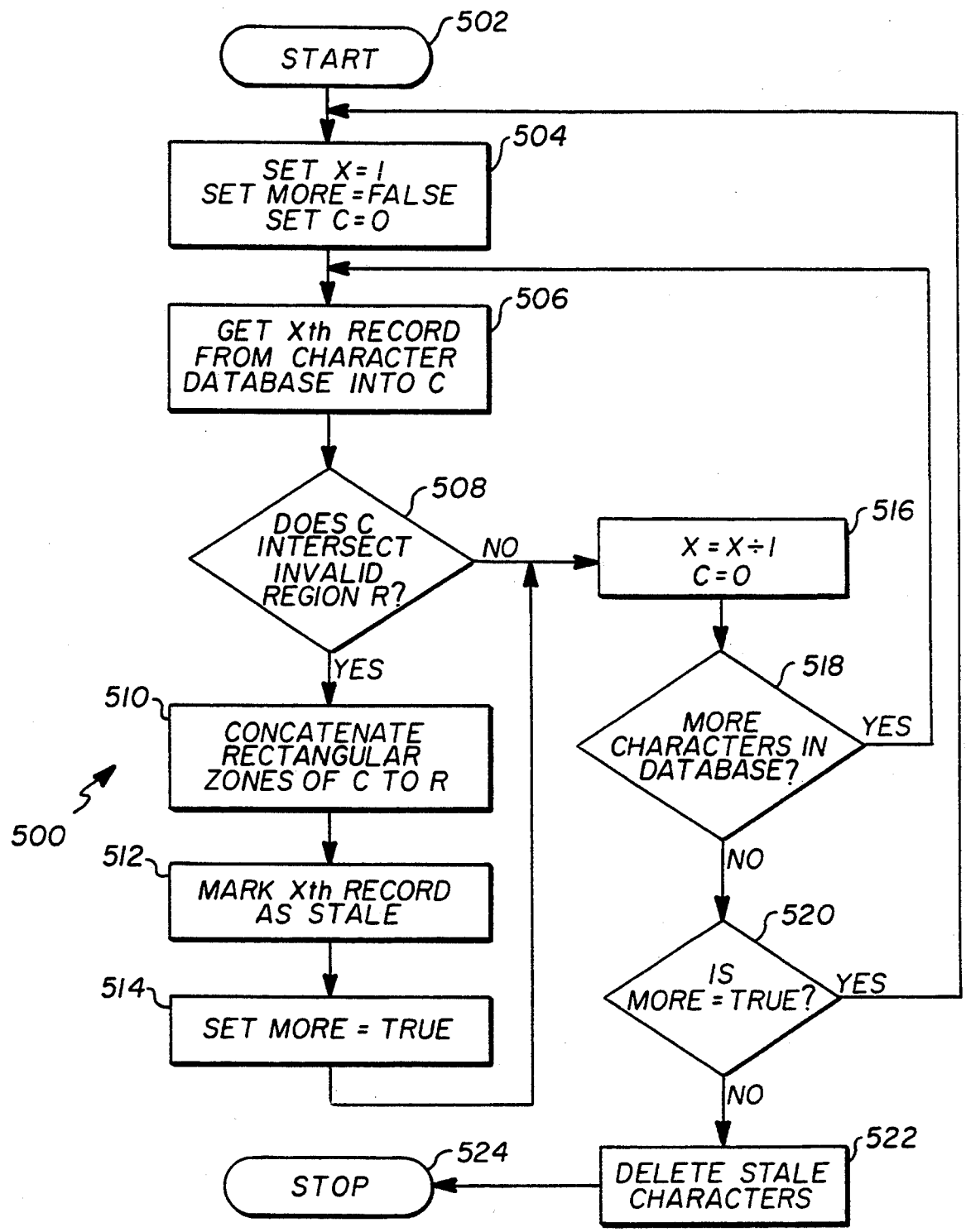
FIG. 6 is a flow chart setting forth the steps used to accumulate one or more stale regions into a single invalid region.
Figure 10:
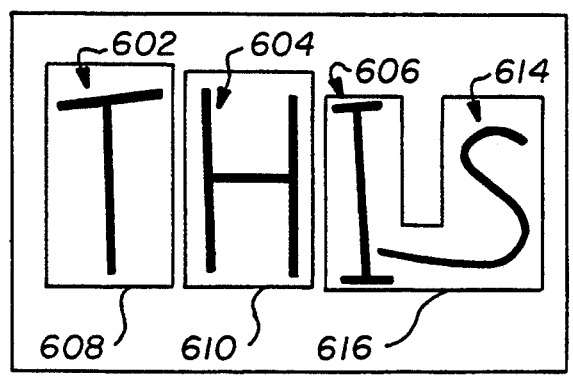

Referring to FIGS. 6 and 10, since invalid region 616 intersects rectangle 612, invalid region 616 will be updated by concatenating the list of rectangular zones enclosing character 606 into invalid region 616 (step 510). After invalid region 616 is updated, the character record corresponding to character 606 is marked as stale (step 512) to indicate that character 606 must be re-segmented and re-classified. Additionally, flag MORE is set to TRUE (step 514) to indicate that the characters previously evaluated characters must also be checked. However, during the next processing cycle region accumulation module 212 will determine that character 604, adjacent to character 606, is not overlapped so that further region accumulation will not be required.

Figure 11:
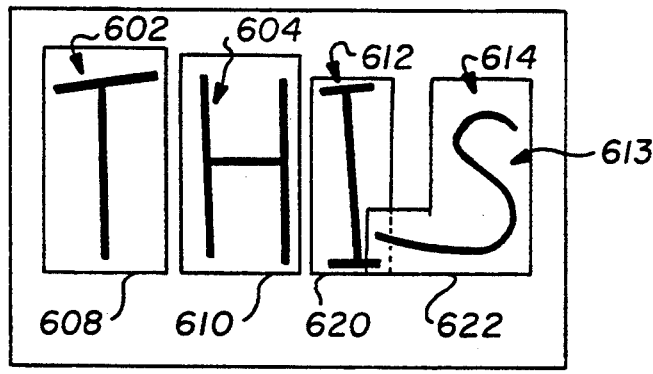
Figure 12:
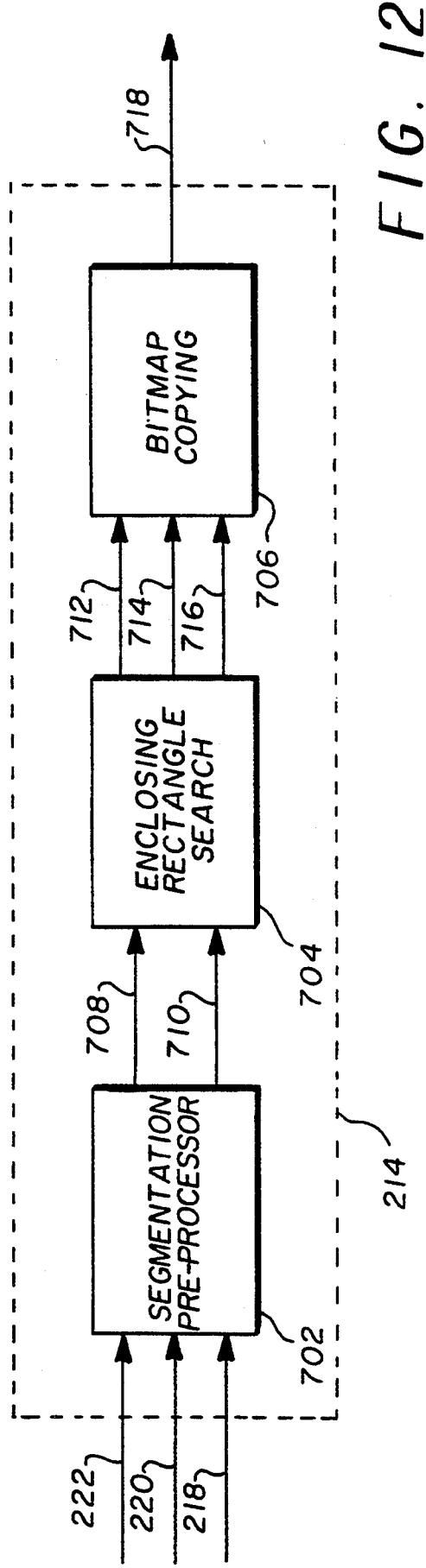
FIG. 12 is a simplified block diagram of a flood-fill segmenting module in accordance with the present invention.

Invalid region 616 is then sent to a segmenting algorithm, such as that performed by flood-fill segmenting module 206 of the present invention, for re-segmentation of character 606 and segmentation of pen stroke 614. Segmented characters 606 and 618 are thereafter sent to a character classifier for classification in accordance with known techniques. After recognition, characters 606 and 618 are embraced by corresponding overlapping regions 620 and 622, respectively (FIG. 11). FIG. 11 shows characters 602, 604, 606, and 618, and respective regions 608, 610, 620 and 622 corresponding thereto after final segmentation and classification.

Referring now to FIGS. 12-19, a preferred embodiment of flood-fill segmenting module 214 and the flood-fill algorithm executed thereby will now be discussed. Although flood-fill segmenting module 214 may be used without region accumulation module 212, a preferred embodiment of the present invention provides for the use of flood-fill segmenting module 214 in conjunction with region accumulation module 212. As previously indicated, flood-fill segmenting module 214 comprises three sub-modules: a pre-processor module 702, an enclosing rectangle search module 704, and a bitmap copying module 706; the simplified block diagram of FIG. 12 sets forth the functional relationship of and data flow between these three modules.

Region accumulator 212 transmits the source bitmap (i.e. the digital data comprising the invalid region) to pre-processor module 702. More specifically, if there is no overlapping between the newly drawn characters and one or more previously segmented and classified characters, the source bitmap provided by region accumulation module 212 will contain the newly drawn characters. If, however, there is such overlapping, the source bitmap provided by region accumulation module 212 will also contain the stale regions corresponding to the overlapped characters.

Region accumulation module 212 also applies a Boolean signal 220, corresponding to the Boolean variable discussed above in connection with FIG. 5, to pre-processor module 702. The value of Boolean signal 220 determines which method is used by pre-processor module 702 to locate a root pixel on the character or characters contained in the source bitmap, as discussed more fully below. In particular, if Boolean signal 220 is FALSE, a raster method is used; if Boolean signal 220 is TRUE, pen stroke and stale root pixel information is used to locate the root pixels. Note that if pre-processor module 702 is not being used with region accumulation module 212, then the value of Boolean signal 220 is always set to FALSE. Additionally, if the source bitmap contains two or more overlapping characters, a single root pixel is defined for the combination of overlapping characters.

The raster method of locating a root pixel involves sequentially scanning the pixels of the source bitmap (e.g. left to right, top to bottom) to form the list of candidate root pixels. Specifically, each pixel of the source bitmap is checked and all pixels within the one or more characters having a grey level value indicative of a character pixel (e.g. black pixels or pixels having a binary value=1) are placed onto a list of candidate root pixels. The raster method is advantageously used if either: (1) flood-fill segmenting module 214 is being used without region accumulation module 212; or (2) one or more erasures have been made in the source bitmap.

If Boolean signal 220 is TRUE, then pen stroke and stale root pixel information is applied to pre-processor module 702 over data bus 218. The optional use of pen stroke information and stale root pixel information allows a more selective (and thus faster) search for candidate root pixels to be conducted. The pen stroke information comprises a list of non-erasure pen strokes which have been added to the source bitmap since flood-fill segmenting module 214 was previously called. Each pen stroke inherently represents a plurality of pixels located on a corresponding character; thus, any pixel of a pen stroke can potentially function as a root pixel for that character. Pre-processor module 702 need only select one pixel per pen stroke as a candidate root pixel for that character.

Similarly, stale root pixel information comprises a plurality of root pixels corresponding to characters rendered stale since flood-fill segmenting module 214 was previously called. As with pen stroke information, any stale root pixel can function as a candidate root pixel for the character being segmented. In fact, for a character or characters rendered stale by the addition of an overlapping pen stroke or character, any one of the corresponding stale root pixels can function as the root pixel for the combination. Again, pre-processor module 702 need only select one stale root pixel as the candidate root pixel for that character combination.

Figure 13:
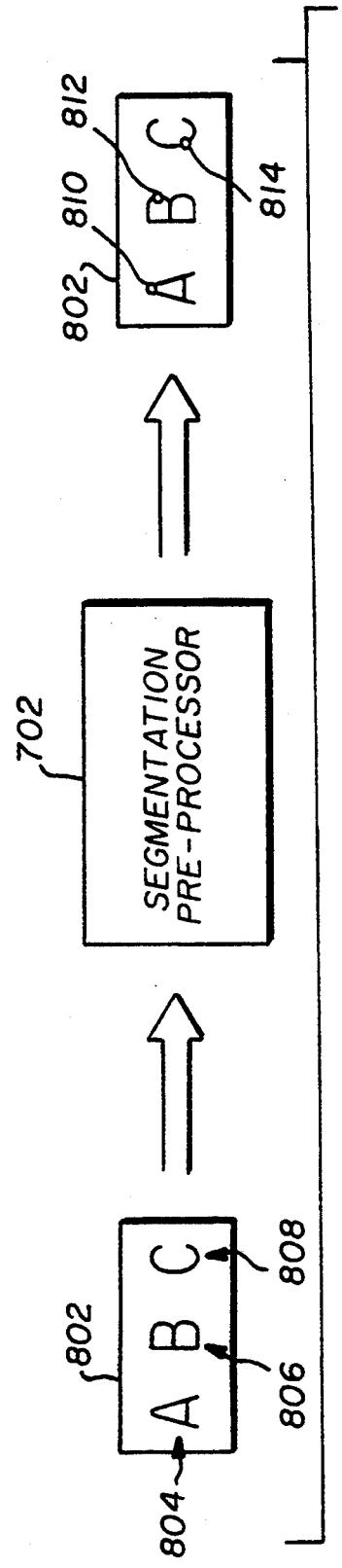
FIG. 13 is a schematic block diagram illustrating the effect of locating one or more candidate root pixels on characters within a source bitmap.

Referring briefly to FIG. 13, an example of the function of pre-processor module 702 is graphically shown. A source bitmap 802 containing respective non-overlapping characters 804, 806, and 808 is provided as input to pre-processor module 702. The output of pre-processor module 702 is shown graphically as source bitmap 802 further including exemplary candidate root pixels 810, 812, and 814 corresponding, respectively, to characters 804, 806, and 808.

Returning now to FIG. 12, the source bitmap and list of candidate root pixels are sent from pre-processor module 702 to enclosing rectangle search module 704. Module 704 determines a smallest rectangle which uniquely encloses each character in the source bitmap. The enclosing rectangle is specified by two coordinate pairs, for example coordinates corresponding to the upper left-hand corner and the lower right-hand corner of the rectangle. As discussed more fully in connection with FIGS. 16-19, an enclosing rectangle search yields a single root pixel and enclosing rectangle for each non-overlapping, newly drawn character in the source bitmap; a single root pixel and enclosing rectangle are also identified for each combination of overlapped characters. The enclosing rectangle specifies the overall size and location of the character (or group of overlapped characters) which contains a particular root pixel.

Figure 14:
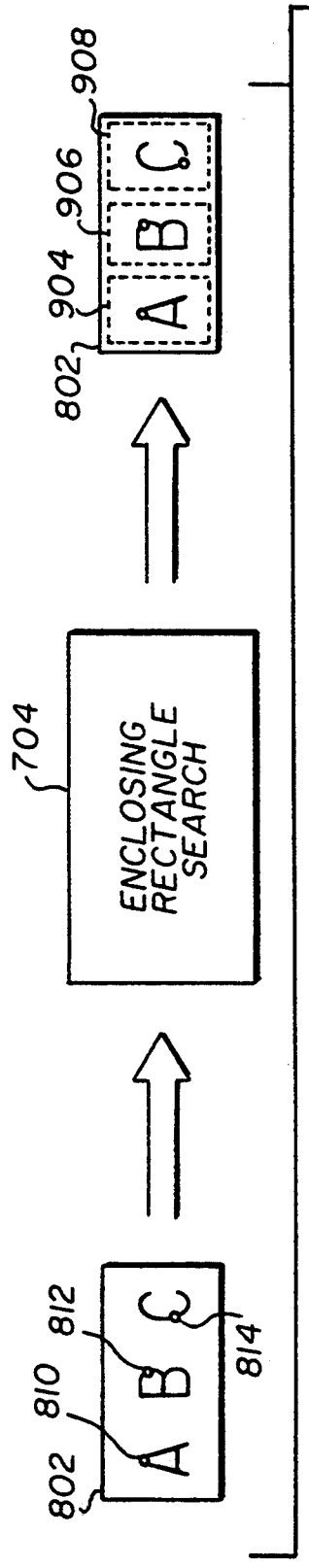
FIG. 14 is a schematic block diagram illustrating the effect of determining an enclosing rectangle for each character within a source bitmap.
Figure 15:
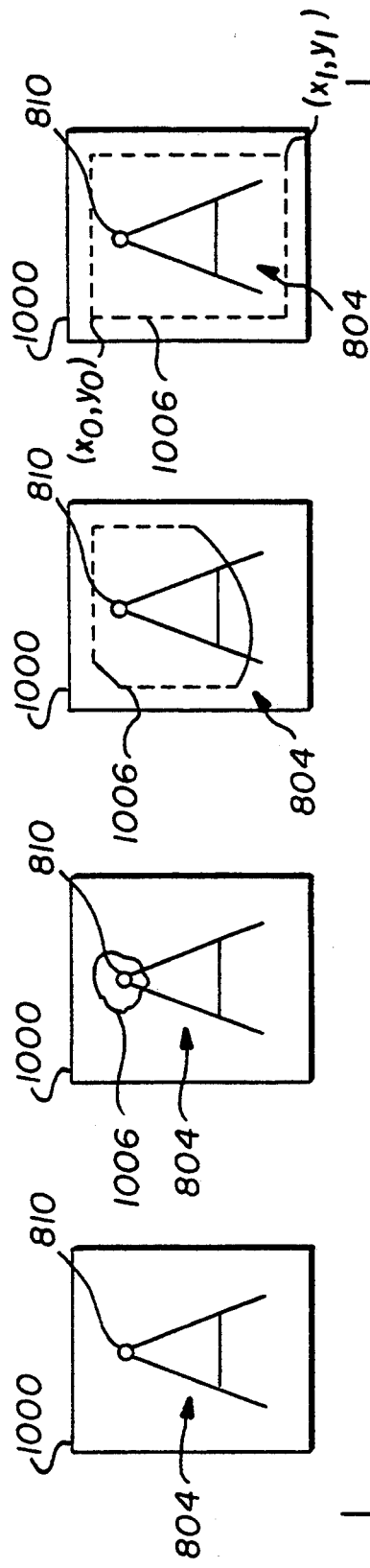
FIG. 15 is a more detailed diagram of the determination of an enclosing rectangle for one of the characters of FIG. 14.

Referring now to FIGS. 14 and 15, source bitmap 802 containing exemplary candidate root pixels 810, 812, and 814 is applied to enclosing rectangle search module 704. More particularly, as shown in FIG. 15, starting with root pixel 810, module 704 recursively searches each neighboring pixel of root pixel 810 for character pixels (e.g. black pixels), until no additional character pixels are found within the pre-determined tolerance from any other character pixel. In the preferred embodiment, the tolerance comprises two values; an x distance and a y distance which represent the distance, in terms of number of pixels, that a black pixel may be located from a nearby pixel and still constitute a character pixel. As the enclosing rectangle search is being conducted, an enclosing rectangle 1006 is formed by incorporating all visited pixels having a HI (or ON) logic value thereinto. The completed enclosing rectangle 1006 is defined by two pairs of coordinates corresponding, for example, to the upper-left ($x_0$, $y_0$) and lower-right ($x_1$, $y_1$) corners of the enclosing rectangle. During the process of forming the enclosing rectangle, the remaining candidate root pixels are eliminated from the list of candidate root pixels for each character, resulting in a single root pixel and an associated enclosing rectangle for each character (or group of overlapped characters).

Referring again to FIG. 12, the source bitmap and the resulting root pixel and enclosing rectangle information is sent from enclosing rectangle search module 704 to bitmap copying module 706. Bitmap copying module 706 copies each segmented character (or group of overlapped characters) within its corresponding enclosing rectangle to an individual destination bitmap. For example, referring again briefly to FIG. 15, character 804 within enclosing rectangle 1006 would be copied to a unique destination bitmap. Each destination bitmap is subsequently applied to character classifier 230 (FIG. 2), whereupon an alphanumeric character is assigned to each destination bitmap in accordance with known techniques. For destination bitmaps which comprise a group (e.g. two or more) of overlapped characters, more sophisticated classification techniques are required for properly classifying the overlapped characters; such classification is, however, beyond the scope of the present invention.

Referring now to FIGS. 16–19, the operation of flood-fill segmenting module 214 in segmenting one or more new characters will now be described. Throughout the following discussion, character pixels will be alternatively be referred to a being "ON" or "BLACK," while background pixels will be referred to as being "OFF" or "WHITE."

Figure 16:
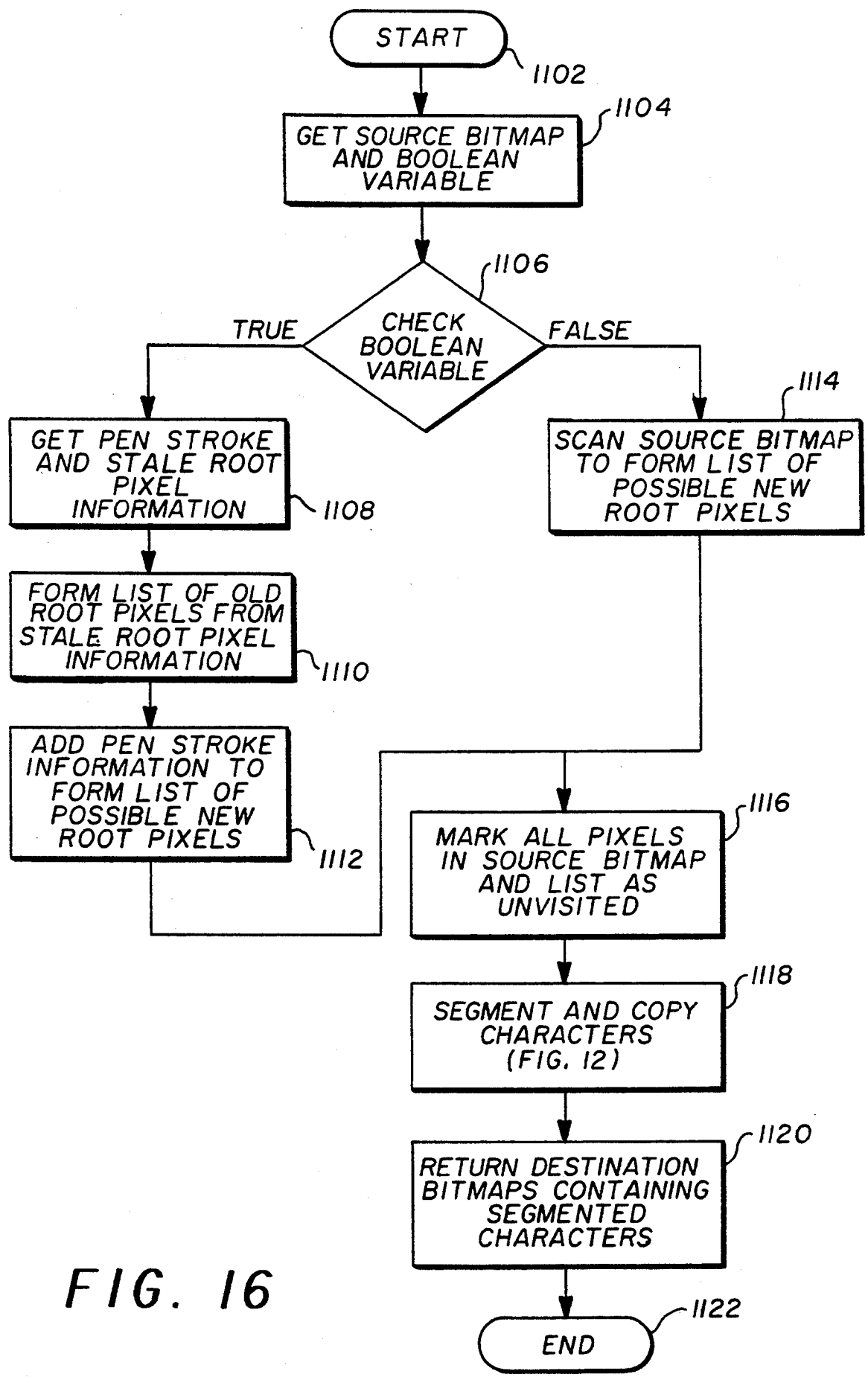
FIG. 16 is a flow chart setting forth the steps used by the segmentation pre-processor module of the present invention to form a list of candidate root pixels.

With reference to FIG. 16, pre-processor 702 first obtains the Boolean signal and a source bitmap (i.e. the invalid region data) from region accumulator module 212 (step 1104). Recall that the source bitmap may contain one or more characters, as determined by the user. Moreover, a group (e.g. two or more) of overlapped characters is interpreted as a continuous pen stroke and, hence, as a single character in the context of the present invention.

Upon obtaining the source bitmap and Boolean variable, pre-processor module 702 determines whether the Boolean signal value is TRUE or FALSE (step 1106). If the Boolean signal value is TRUE, pre-processor 702 obtains the corresponding pen stroke and stale root pixel information (step 1108). Pre-processor 702 forms the stale root pixel information into a list of old root pixels (step 1110), and then adds a pixel from each pen stroke of the new characters to the list of old root pixels to form the list of candidate root pixels (step 1112).

Alternatively, if the Boolean signal value is FALSE, pre-processor module 702 scans the source bitmap using the raster method to find all of the ON pixels in order to form the list of candidate root pixels (step 1114). Stated differently, at this time each ON pixel of the source bitmap is a candidate root pixel. As each character is subsequently located and segmented, all but one of the candidate root pixels are eliminated from the list of candidate root pixels, resulting in a single root pixel/enclosing rectangle for each character (or group of overlapped characters).

continuing with FIG. 16, once the list of candidate root pixels has been formed by one of the above methods, all pixels in the source bitmap are marked as unvisited (step 1116). The list of candidate root pixels and the source bitmap are then used to segment each character and copy the segmented character to an individual destination bitmap (step 1118). The details of the segmenting and copying steps will be discussed below with reference to FIGS. 17–19. After segmenting and copying, the individual destination bitmaps are returned to classifier 230 (FIG. 2) for character classification (step 1120). In addition, the individual destination bitmaps and corresponding root pixels are added to character database 216.

The segmenting and copying steps will now be discussed with reference to FIGS. 17–19. Pre-processor module 702 selects a candidate root pixel from the list of candidate root pixels for the current source bitmap (step 1204); the selected pixel subsequently becomes the root pixel for its associated character (or group of overlapped characters) as the remaining candidate root pixels for that character are deleted from the list during the segmentation process, discussed below. Module 702 then determines if the selected pixel has been previously visited by interrogating the corresponding pixel in the source bitmap (step 1206). If the selected pixel has been previously visited (as explained below), pre-processor module 702 determines if the list of candidate root pixels is empty (step 1222), i.e., whether any more characters in the source bitmap need to be segmented. If the list is not empty, another candidate root pixel, corresponding to the next character in the source bitmap, is selected from the list (step 1204). If the list is empty, the process ends (step 1224).

If the selected candidate root pixel for a particular character has not been previously visited in the source bitmap, the selected pixel becomes the root pixel for its associated character (or group of characters if overlapped) (step 1208). Pre-processor module 702 then initializes an enclosing rectangle to enclose the root pixel (step 1210) and resets the tolerances to a maximum value (step 1212). Pre-processor module 702 then sends the root pixel, the initial enclosing rectangle, the tolerances, and the source bitmap to enclosing rectangle search module 704 (step 1214). The processing of this data by enclosing search module 704 is discussed below in connection with FIG. 18.

Once the enclosing rectangle corresponding to the root pixel has been determined by enclosing search module 704 (step 1214), pre-processor module 702 initializes a destination bitmap of exactly the same size as the enclosing rectangle and sets all pixels in the destination bitmap to OFF (step 1216). Pre-processor module 702 then resets the tolerances to the maximum value and marks all pixels in the destination bitmap as unvisited (step 1218). Pre-processor module 702 then sends the root pixel, the tolerances, and the destination bitmap to bitmap copying module 706 (step 1220). The processing of this data by bitmap copying module 706 is discussed below in connection with FIG. 19.

Once the segmented character corresponding to the selected root pixel has been copied to a destination bitmap by bitmap copying module 706, pre-processor module 702 then determines if the list of candidate root pixels is empty (step 1222). If the list is empty, indicating that all characters (or group of overlapped characters) in the source bitmap have been segmented, processing ends (step 1224). If the list is not empty, another candidate root pixel is selected from the list, and the above described process (steps 1204–1222) is repeated until all characters (or group of overlapped characters) in the source bitmap are segmented.

With momentary reference to step 1214, enclosing rectangle search module 704 receives the root pixel, the enclosing rectangle, the tolerances, and the source bitmap from pre-processor module 702. Referring now to FIG. 18, enclosing rectangle search module 704 determines whether the selected root pixel has been visited in the source bitmap (step 1304); if so, the enclosing rectangle search ends (step 1320). If the selected root pixel has not been visited, search module 704 determines whether the selected root pixel is ON (step 1306). If the selected root pixel is ON, the enclosing rectangle is expanded to include the ON pixel (step 1316). Enclosing rectangle search module 704 then resets the tolerances to a pre-determined maximum value (step 1312).

If the selected root pixel is OFF, enclosing rectangle search module 704 determines whether the tolerances are equal to zero (step 1308). If the tolerances are equal to zero, the enclosing rectangle search ends (step 1320). If the tolerances are not equal to zero, enclosing rectangle search module 704 reduces the value of the tolerances according to a pre-determined schedule (step 1310).

Figure 18:
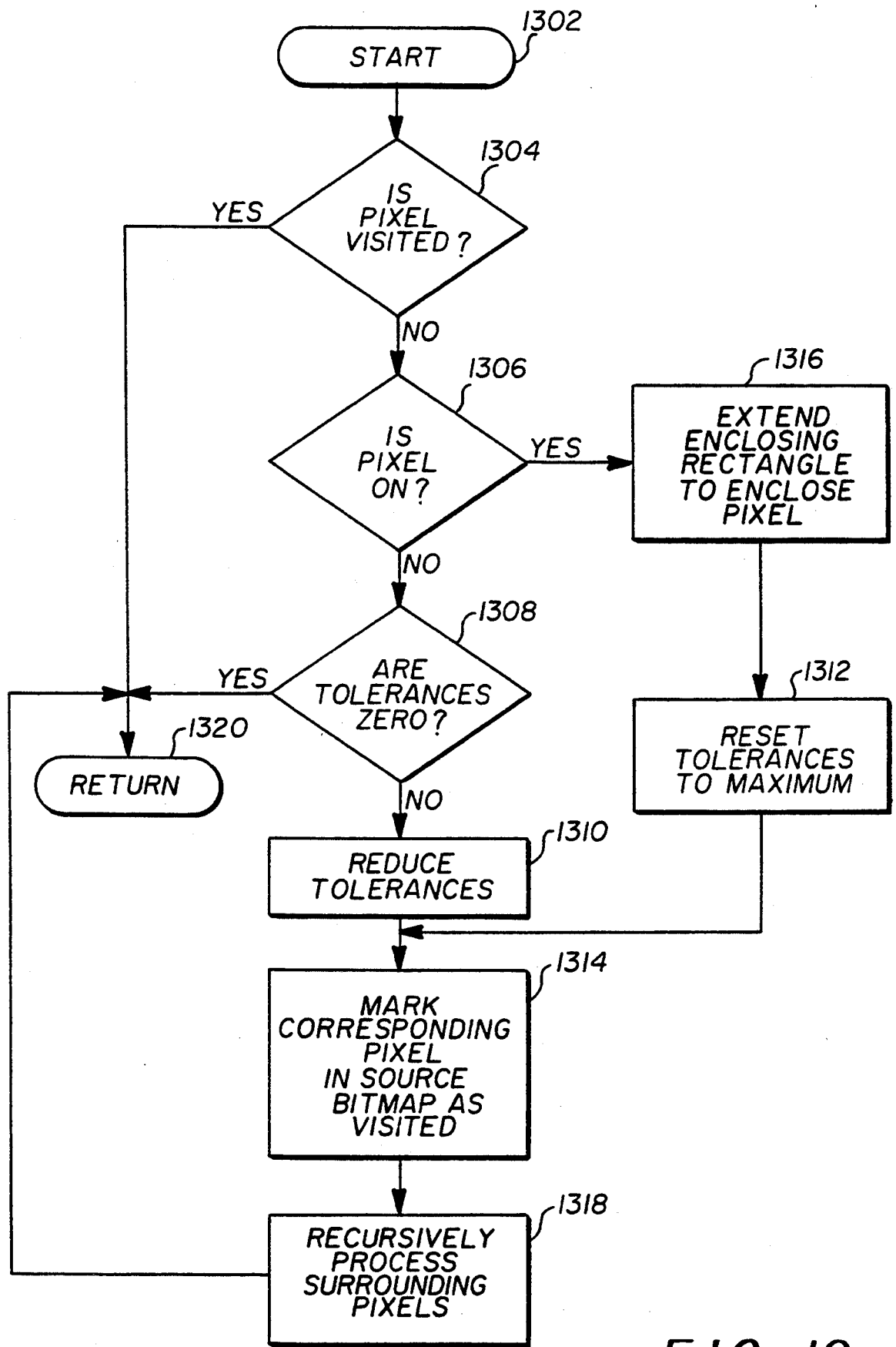
FIG. 18 is a flow chart setting forth the steps used by the enclosing rectangle search module of the present invention to determine the enclosing rectangles corresponding to one or more root pixels.

Continuing with FIG. 18, once the tolerances have either been reset to the maximum value (step 1312), or reduced according to the pre-determined schedule (step 1310), search module 704 marks the root pixel as visited in the source bitmap (step 1314).

once the root pixel has been enclosed by the enclosing rectangle (step 1316), search module 704 recursively processes the four pixels surrounding the root pixel, as discussed above in connection with steps 1306–1316, in a specific order; in the preferred embodiment, the following order is used: left, right, top, and bottom (step 1318). For example, search module 704 determines whether the pixel located to the immediate left of the root pixel ("left pixel") has been visited in the source bitmap; if so, the enclosing rectangle search ends (step 1320). If the left pixel has not been visited, enclosing rectangle search module 704 determines whether the left pixel is ON. If the left pixel is ON, module 704 extends the enclosing rectangle to enclose the left pixel (step 1316) and resets the tolerances to the maximum value (step 1312).

If the left pixel is OFF, module 704 determines whether the tolerances are equal to zero; if so, the enclosing rectangle search ends. If the tolerances are not equal to zero, module 704 reduces the value of the tolerances according to a pre-determined schedule.

Continuing with FIG. 18, once the tolerances have either been reset to the maximum value or reduced according to the pre-determined schedule, rectangle search module 704 marks the left pixel as visited in the source bitmap. Search module 704 then recursively repeats the process (steps 1304–1316) for the pixel to the immediate left of the left pixel ("left-left pixel") and so on, until either: (1) the boundary of the source bitmap is reached; or (2) there are no more ON pixels within a specific distance ("tolerance") from a known character (i.e. ON) pixel. Enclosing rectangle search module 704 then recursively repeats the process (steps 1304–1316) for pixels to the right, top, and bottom of the selected root pixel until the enclosing rectangle is complete. The search pattern used in the preferred embodiment is called a "depth-first" search and is well-known to those skilled in the art.

Figure 17:
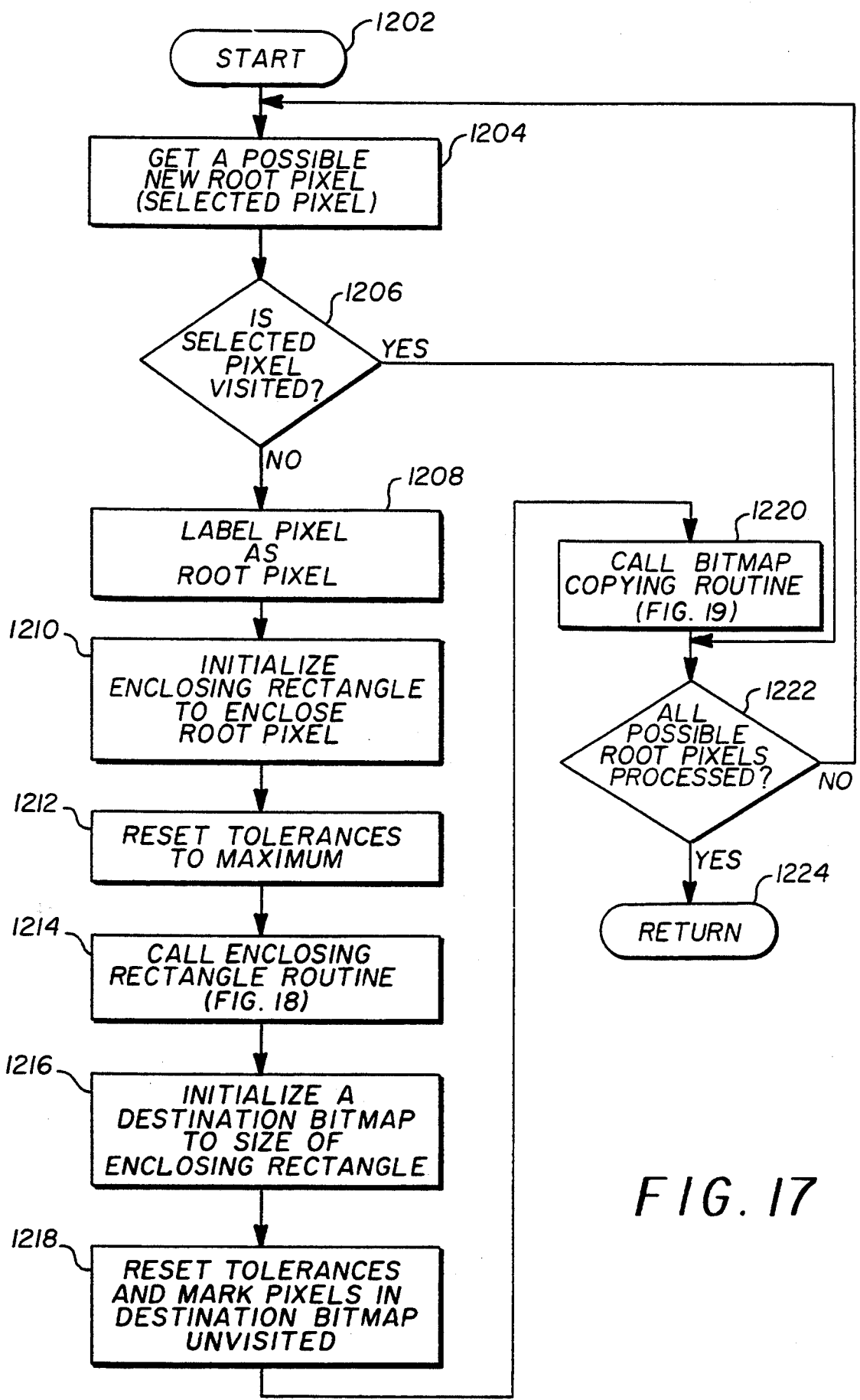
FIG. 17 is a flow chart setting forth the steps used by the segmentation pre-processor module of the present invention to supervise the segmentation and bitmap copying of the source bitmap.

With momentary reference to FIG. 17, step 1220, bitmap copying module 706 receives the destination bitmap, the root pixel, and the tolerances from pre-processor module 702. Referring now to FIG. 19, bitmap copying module 706 copies the previously created enclosing rectangle to a destination bitmap using the same recursive techniques employed in creating the enclosing rectangle discussed above in connection with FIG. 18. More particularly, bitmap copying module 706 determines whether the pixel in the destination bitmap corresponding to the root pixel has been visited (step 1404). If such corresponding pixel has been visited, the bitmap copying ends (step 1420). If such corresponding pixel has not been visited, bitmap copying module 706 determines whether the root pixel is ON (step 1406). If the root pixel is ON, bitmap copying module 706 resets the tolerances to the maximum value (step 1412).

If the root pixel is OFF, bitmap copying module 706 determines whether the tolerances are equal to zero (step 1408). If the tolerances are equal to zero, the bitmap copying ends (step 1420). If the tolerances are not equal to zero, bitmap copying module 706 reduces the value of the tolerances according to a pre-determined schedule (step 1410).

Figure 19:
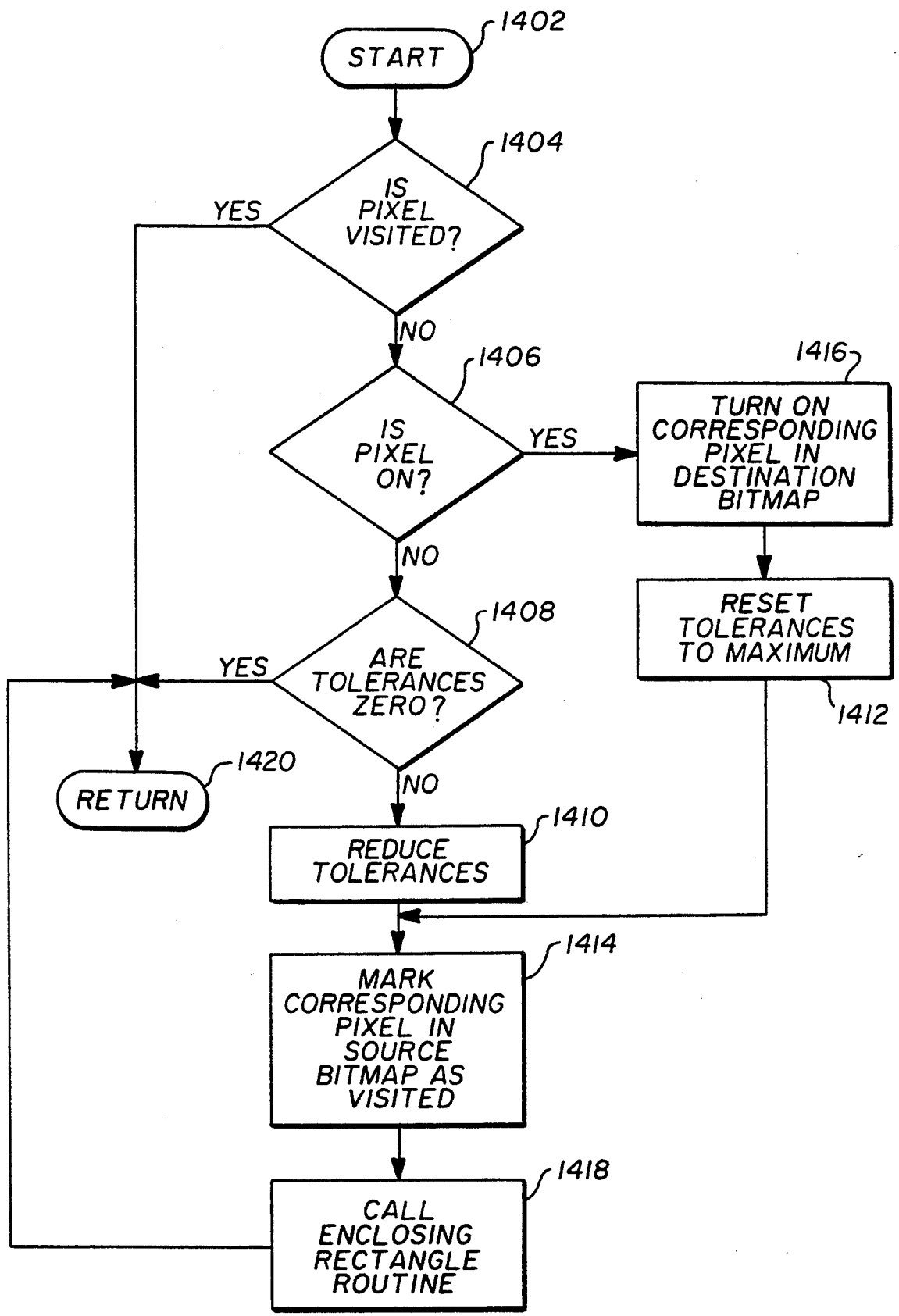
FIG. 19 is a flow chart setting forth the steps used by the bitmap copying module of the present invention to copy each character contained within an enclosing rectangle to a separate destination bitmap.

Continuing with FIG. 19, once the tolerances have either been reset to the maximum value (step 1412), or reduced according to the pre-determined schedule (step 1410), bitmap copying module 706 marks the root pixel as visited in the destination bitmap (step 1414). Bitmap copying module 706 then turns ON the pixel in the destination bitmap corresponding to the selected root pixel (step 1416).

Once the corresponding pixel has been turned ON in the destination bitmap (step 1416), bitmap copying module 706 recursively processes the four pixels surrounding the selected root pixel in a specific order, in the preferred embodiment: left, right, top, and bottom (step 1418). For example, in the preferred embodiment bitmap copying module 706 interrogates the destination bitmap to determine whether the pixel immediately left ("left pixel") of the pixel corresponding to the root pixel has been visited (step 1404). If the left pixel has been visited, the bitmap copying ends (step 1420). If the left pixel has not been visited in the destination bitmap, bitmap copying module 706 determines whether its corresponding pixel in the source bitmap is ON (step 1406). If the corresponding pixel is ON, bitmap copying module 706 resets the tolerances to the maximum value (step 1412). Bitmap copying module 704 then turns ON the pixel in the destination bitmap corresponding to the selected root pixel (step 1416).

If the corresponding pixel is OFF, bitmap copying module 706 determines whether the tolerances are equal to zero (step 1408). If the tolerances are equal to zero, the bitmap copying ends (step 1420). If the tolerances are not equal to zero, bitmap copying module 706 reduces the value of the tolerances according to a pre-determined schedule (step 1410).

Continuing with FIG. 19, once the tolerances have either been reset to the maximum value (step 1412), or reduced according to the pre-determined schedule (step 1410), bitmap copying module 706 marks the left pixel as visited in the destination bitmap (step 1414). The process is then recursively repeated (steps 1404–1416) for the pixel to the immediate left of the left pixel ("left-left pixel") and so on, until either: (1) the boundary of the destination bitmap is reached; or (2) there are no more ON pixels within a specific distance ("tolerance") of a known character pixel. Bitmap copying module 706 then recursively repeats the process (steps 1404–1416) for pixels to the right, top, and bottom.

Once the bitmap copying process is complete, i.e. once the segmented character corresponding to the root pixel has been copied to a destination bitmap by module 706 for each character (or group of overlapped characters) in the source bitmap, the resulting destination bitmaps are sent from flood-fill segmentation module 214 to conventional character classifier module 230 over a fourth data bus 232 (FIG. 2). Character classifier module 230 classifies the segmented character pattern contained in each destination bitmap as a particular alphanumeric character using one or more methods known in the art. Note that the corresponding root pixels would not typically be sent from flood-fill segmentation module 214 to character classifier module 230.

Additionally, the destination bitmaps and corresponding root pixels are sent from flood-fill segmentation module 214 to character database 216 over a fifth data bus 224 for storage and use in segmenting subsequently drawn characters. Character database 216 contains information regarding each character that has been previously segmented and classified, including the character's alphanumeric identity, size (i.e. the size of its enclosing rectangle), and root pixel. The stored character information is subsequently used by region accumulation module 212 to construct additional invalid regions in response to new character input. Additionally, region accumulation module 212 deletes stale character information from character database 216 for characters that are to be re-segmented and reclassified.

Although a particular embodiment for segmenting handwritten characters as they are drawn has been described for the purpose of illustrating the principles of the present invention, it will be appreciated that the invention is not limited thereto. Accordingly, those skilled in the art will appreciate that various modifications, variations, and rearrangements of the elements of system 200 may be made without departing from the spirit of the invention as expressed in the appended claims.

I claim:

1. A method for recognizing an object contained within an image, the method comprising the steps of;
   generating an electronic bitmap, comprising a plurality of pixels, representative of said image;
   identifying a group of said pixels, each having a grey-level value associated therewith, associated with said object;
   enclosing a region of said bitmap including said group of pixels within an invalid region, wherein said enclosing step comprises the step of determining an optimum portion of said bitmap needed to segment said object, wherein said determining step comprises the step of ascertaining whether said object overlaps a second object in said image;
   processing said invalid region to thereby segment said object; and
   thereafter classifying said segmented object.

2. The method of claim 1 wherein said determining step further comprises the steps of:
   determining an optimum second portion of said bitmap which encloses said second object; and
   accumulating said second portion of said bitmap into said invalid region.

3. The method of claim 1 wherein said invalid region comprises a list of one or more first enclosing zones, wherein each of said one or more first enclosing zones encloses a portion of said object.

4. The method of claim 1 wherein said determining step comprises determining the smallest portion of said bitmap needed to segment said object.

5. The method of claim 1 wherein said invalid region comprises a list of one or more first enclosing zones, wherein each of said one or more first enclosing zones encloses a portion of said object, and wherein said accumulating step comprises the step of concatenating said list of one or more first enclosing zones with a list of one or more second enclosing zones associated with said second object.

6. A method for classifying a character in a bitmap, said character comprising indicia of one or more pen strokes, said method comprising the steps of:
   forming an invalid region about said character, wherein said step of forming said invalid region comprises the step of determining a smallest portion of said bitmap needed to enclose said character, wherein said determining step comprises the step of determining whether said character overlaps a previously classified character in said bitmap;
   segmenting said character using said invalid region; and
   thereafter classifying said character.

7. The method of claim 6 wherein said determining step further comprises the steps of:
   determining a smallest portion of said bitmap needed to enclose said overlapped character; and
   concatenating said smallest portion of said bitmap needed to enclose said character into said smallest portion of said bitmap needed to enclose said overlapped character to form an updated invalid region.

8. The method of claim 7 wherein said smallest portion of said bitmap needed to enclose said overlapped character comprises a list of one or more second enclosing zones, wherein each of said one or more second enclosing zones encloses one or more pen strokes associated with said overlapped character.

9. The method of claim 8 wherein said forming step comprises the step of accumulating said list of one or more second enclosing zones into said list of one or more first enclosing zones.

10. The method of claim 6 wherein said forming step comprises the step of creating a list of one or more first enclosing zones, wherein each of said one or more first enclosing zones encloses one of said one or more pen strokes of said character.

11. Apparatus for recognizing handwritten text on a background, said handwritten text including one or more characters each including one or more pen strokes, said apparatus comprising:
    means for forming a list of one or more first regions, each of said one or more first regions corresponding to one of said one or more pen strokes;
    means for segmenting said list of one or more first regions to extract said one or more characters of said handwritten text from said background;
    means for classifying one or more characters to recognize said handwritten text;
    means for forming a list of one or more second regions, each of said one or more second regions corresponding to one of said one or more pen strokes of a previously segmented or classified character which is overlapped by said one or more characters; and
    means for accumulating said list of one or more second regions into said list of one or more first regions to update said list of one or more first regions.

* * * * *